Patented Mar. 30, 1943

2,315,321

UNITED STATES PATENT OFFICE 2,315,321

LEAK SEALING COMPOSITION

John Lloyd Evans, Rockford, Ill., and Walter A. Hall, Flint, Mich., assignors to E. I. du Pont de Nemours & Company, Wilmington, Del., a corporation of Delaware No Drawing. Application April 19, 1941, Serial No. 389,420

3 Claims. (Cl. 106—33)

This invention relates to a composition for sealing leaks in liquid circulating systems, and more particularly to an improved composition for sealing leaks in automobile cooling systems.

Compositions for sealing leaks in liquid circulating systems and processes for manufacturing such compositions are familiar and constitute a somewhat recent but well-known art. The most widely used types of circulating system sealing compositions are designed to work in water or an aqueous medium. They consist, therefore, of a finely divided solid material capable of being suspended without coagulation in water or an aqueous medium, together with some material suitable as a binder. Various other materials, such as alcohols to reduce foaming, are frequently added to further enhance the quality or the working properties of the composition. These materials have the disadvantage that they do not withstand automobile shocks, and are sometimes adversely affected by anti-freeze compositions.

The use of rosin or synthetic resin soaps as emulsifying agents is well known in the arts and pertinent literature. Insofar as the scope of the present invention is concerned, it is to be clearly understood that no claims are made based on emulsifying or suspending properties of rosin or artificial resin soaps, nor is any claim made based on the powers of the solid materials used for stopping leaks. In the present invention as shown below, it has been discovered that rosin or artificial resin soaps of the organic amines subsequently listed have definite advantages when used in conjunction with a glue, gelatin, corn starch, wheat flour, gum arabic, gum tragacanth, etc., and with or without silicic acid or a soluble silicate in a liquid circulating system sealing composition.

This invention has an object, therefore, the provision of a liquid circulating system sealing composition which will, when introduced into a circulating system, close leaks up to a considerable size.

Another object of this invention is to provide an improved composition for sealing leaks in liquid circulating systems which will readily be carried to all parts of the system by the normal flow of the circulating medium.

Another object of this invention is to provide a composition for sealing leaks in liquid circulating systems that will not plug the system itself nor produce any harmful effects on any part of the circulating system.

Another object of this invention is to provide a composition for sealing leaks in liquid circulating systems that may be used in the presence of materials other than water, and more particularly in the presence of aqueous solutions of materials commonly used as anti-freeze compositions, such as: methyl alcohol, ethyl alcohol, glycerol, ethylene glycol, diethylene glycol, etc.

Still another object of this invention is to provide a composition for sealing leaks in liquid circulating systems with sufficient permanence that all ordinary shocks or vibrations, such as those of an automobile, will fail to reopen the leak.

Another object of this invention is to provide a composition for sealing leaks in liquid circulating systems such that the ordinary agitation of the circulating liquid produced by the circulating device will fail to produce either an appreciable or a long lasting or stable foam. Other objects will appear hereinafter.

These objects are accomplished in the following invention by adding to an aqueous solution or dispersion of a rosin or artificial resin soap a suitable filler, such as asbestos fibre, together with a suitable agent for keeping the filler dispersed, such as glue, corn starch, wheat flour, gelatin, gum arabic, gum tragacanth, etc. As an aid to the accomplishment of these objects, especially when a rosin soap is employed, silicic acid, or a soluble silicate, in suitable quantities may be added. As a further aid to the accomplishment of these objects, the pH of the composition is adjusted by the addition of some suitable acid. We prefer to use orthophosphoric acid, although other acids, such as acetic acid, are effective.

The invention in its preferred form consists of an aqueous, or continuous phase and a solid or dispersed phase. To form the aqueous phase, tetra-sodium pyro-phosphate or tri-sodium phosphate is first dissolved in the proper volume of water, and rosin or a rosin-monoglyceride condensation product, together with a suitable amount of glue, corn starch, wheat flour, gelatin, gum arabic, gum tragacanth, etc., is added. The mixture is then heated to a temperature sufficient to cause the glue and the rosin or synthetic resin to be melted; then with continuous agitation the organic amine or ammonia is added, followed after a few minutes by the filler. At this point sodium silicate may be added. The pH of the final composition is adjusted to a value less than 10 and greater than 5.

The invention will be more clearly understood from the following examples which are given by way of illustration.

*Example I*

|  | Grams |
|---|---|
| Water | 700.0 |
| Tetra-sodium pyro-phosphate | 10.0 |
| Glue | 40.0 |
| Rosin | 40.0 |
| Monoethanolamine | 7.5 |
| Asbestos fibre | 40.0 |
| Sodium silicate | 25.0 |
| Ortho-phosphoric acid | 8.5 |
|  | 871.0 |

*Example II*

|  | Grams |
|---|---|
| Water | 700.0 |
| Tetra-sodium pyro-phosphate | 10.0 |
| Glue | 40.0 |
| Synthetic resin | 40.0 |
| Monoethanolamine | 5.5 |
| Asbestos fibre | 40.0 |
| Sodium silicate | 25.0 |
| Ortho-phosphoric acid | 8.5 |
|  | 869.0 |

The proportions of ingredients listed above may be varied without failing to obtain the objects listed heretofore. As an example of the degree to which the proportions of ingredients may be varied, the following formulas are given:

*Example III*

|  | Grams |
|---|---|
| Water | 500.00 to 1500.00 |
| Tetra-sodium pyro-phosphate | 5.00 to 15.00 |
| (or) Tri-sodium phosphate | 5.00 to 15.00 |
| Glue | 10.00 to 60.00 |
| Rosin | 20.00 to 60.00 |
| Monoethanolamine | 3.25 to 10.75 |
| Asbestos fibre | 5.00 to 60.00 |
| Sodium silicate | 10.00 to 30.00 |
| Ortho-phosphoric acid | 4.00 to 12.00 |

*Example IV*

|  | Grams |
|---|---|
| Water | 500.00 to 1500.00 |
| Tetra-sodium pyro-phosphate | 5.00 to 15.00 |
| (or) Tri-sodium phosphate | 5.00 to 15.00 |
| Glue | 5.00 to 60.00 |
| Synthetic resin | 20.00 to 60.00 |
| Monoethanolamine | 2.75 to 8.00 |
| Asbestos fibre | 5.00 to 60.00 |
| Sodium silicate | 5.00 to 30.00 |
| Ortho-phosphoric acid | 3.50 to 10.00 |

In addition to monoethanolamine, the following nitrogen containing materials having a basic reaction may be used, singly or in any combination, in lieu thereof: ammonia, triethanolamine, diethanolamine, ethylene diamine, 2-amino-2-methyl-1-propanol, propylamine, 2-ethyl amino-ethanol, 2-methyl-aminoethanol, morpholine, N-ethyl morpholine, triethylamine and 2-dimethyl-aminoethanol.

According to this invention, the base of the improved stop-leak composition is a finely divided solid material, preferably of a fibrous nature, which will readily be wet by the solution in the circulating system and thereby prevented from coagulating. We prefer to use a short fibre asbestos, although in some cases paper pulp or wood flour can be substituted. To cause the dispersion of the solid particles and to prevent their coagulation, we have found that the addition of glue in particular, and more generally of such materials as corn starch, wheat flour paste, gelatin, gum arabic, gum tragacanth, etc., to the stop-leak composition is essential to the proper functioning of the composition.

The circulation of the fluid in the circulating system causes the solid particles to be carried to all parts of the circulating system and to be evenly distributed throughout. Consequently, the flow of the fluid through any leak in the circulating system causes the solid material to be brought to the leak, whereupon a mat is quickly formed and the flow of liquid through the leak is rapidly reduced to a very small volume.

The composition also contains a resinous binder in the form of a water soluble or water dispersible soap of an organic amine which, when placed in a circulating system, is immediately dissolved or dispersed in the circulating fluid and is thereby carried to all parts of the circulating system. Consequently, the soap is carried through any leak in the circulating system and thereby permeates the fibrous mat or plug formed in the leak by the solid material of the composition. The action of air on the outer side of the cooling system, together with the heat usually associated with such systems, causes the rosin or resin soap to decompose, thereby depositing the insoluble rosin or resin in the leak. The deposition of the rosin or resin in the fibrous mat in the leak serves to bind the mat into a solid plug, impermeable to the circulating fluid, and also serves to bind the entire plug firmly to the walls of the system. As time passes, the continued action of atmospheric oxygen serves to render the rosin or resin more insoluble and to increase its toughness. The remainder of the rosin or resin soap in the circulating fluid, not being exposed to air, remains undecomposed and is available should the original plug become dislodged.

The composition also contains tetra-sodium pyrophosphate or tri-sodium phosphate with the object of removing those metal ions commonly present in most water and thereby rendering them incapable of reacting with the soluble or dispersed rosin or resin soap to precipitate insoluble soaps of the rosin or resin which might cause stoppage of the circulating system passages.

The composition must also contain silicic acid or a soluble silicate when rosin soaps are employed, to insure the quick formation of a liquid-tight plug. Although silicic acid is not essential to proper functioning of a composition employing soaps of a synthetic resin, it is of value when rosin soaps are used.

To obtain the quick dispersion of the compound throughout the circulating system it is desirable that the composition be first made up so that all of the ingredients are in a water solution or suspension and are thereby in a form to mix readily with, or to dissolve readily in, the circulating system fluid.

The stop-leak composition described above is generally useful for stopping leaks in liquid circulating systems, particularly automobile cooling systems. It is primarily designed to be used where water is the principal circulating constituent, but is useful also in circulating systems employing other liquids in conjunction with water such as glycerol, methyl alcohol, ethyl alcohol, ethylene glycol, diethylene glycol, etc.

The stop-leak composition described above possesses the advantage over other stop-leak compositions of using materials that will not deteriorate due to the action of weathering, or the heat of the engine when used in automobile cooling systems. It possesses the added advantage of increasing in toughness and durability under the influence of atmospheric oxygen and heat. It is also capable of stopping leaks of relatively large size and remains available in the system for a long time.

It is apparent that many widely different embodiments of this invention may be made without departing from the spirit and scope thereof, and therefore, it is not intended to be limited except as indicated in the appended claims.

We claim:

1. A stop-leak composition having a formula within the following range:

| | Parts by weight |
|---|---|
| Water | 500 to 1500 |
| A mucilaginous binder | 10 to 60 |
| A resin | 20 to 60 |
| A fibre | 5 to 60 |
| Sodium silicate | 5 to 30 |
| A water soluble phosphate salt | | said composition having a pH between 5 and 10.

2. The composition of claim 1 which contains between 3.5 and 12 parts of ortho-phosphoric acid.

3. A stop-leak composition having approximately the following formula:

| | Parts by weight |
|---|---|
| Water | 700.0 |
| Tetra-sodium pyro-phosphate | 10.0 |
| Glue | 40.0 |
| Rosin | 40.0 |
| Monoethanolamine | 7.5 |
| Asbestos fibre | 40.0 |
| Sodium silicate | 25.0 |
| Ortho-phosphoric acid | 8.5 |

JOHN LLOYD EVANS.
WALTER A. HALL.